United States Patent [19]

Bergstrom et al.

[11] Patent Number: 4,791,460
[45] Date of Patent: Dec. 13, 1988

[54] READOUT FOR A RING LASER ANGULAR RATE SENSOR

[75] Inventors: James W. Bergstrom, New Brighton; Mark W. Weber, Elk River, both of Minn.

[73] Assignee: Honeywell Inc., Minneapolis, Minn.

[21] Appl. No.: 173,004

[22] Filed: Mar. 31, 1988

Related U.S. Application Data

[63] Continuation of Ser. No. 847,379, Apr. 2, 1986, abandoned.

[51] Int. Cl.$^4$ .............................................. G01C 19/64
[52] U.S. Cl. .................................................. 356/350
[58] Field of Search ........................................ 356/350

[56] References Cited

U.S. PATENT DOCUMENTS 4,504,146  3/1985  Morgan .
4,529,311  8/1985  Morgan et al. .
4,533,250  8/1985  Callaghan et al. .
4,547,072  10/1985  Yoshida et al. ..................... 356/350
4,566,794  1/1986  Hanse ................................. 356/350
4,595,293  6/1986  Geen ................................... 356/350

Primary Examiner—Vincent P. McGraw
Assistant Examiner—Samuel A. Turner
Attorney, Agent, or Firm—Robert A. Pajek

[57] ABSTRACT

A pair of photodetector output signals are positioned so as to be responsive to the interference pattern produced by the pair of laser beams of the ring laser. The photodetectors are positioned such that the output signals are in phase quadrature. A second pair of signals is derived from the first pair of signals in which the second pair are displaced in phase relative to the first pair and are also in phase quadrature. The two pairs of signals are signal processed to enhance resolution of the ring laser readout.

10 Claims, 3 Drawing Sheets

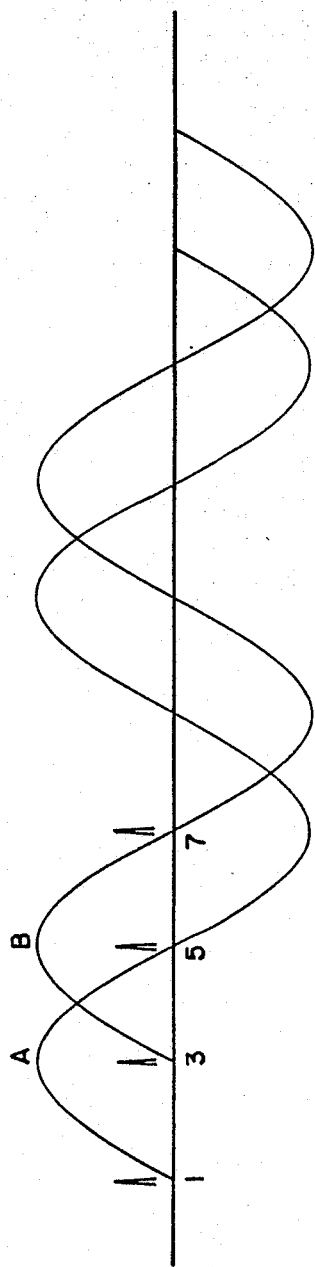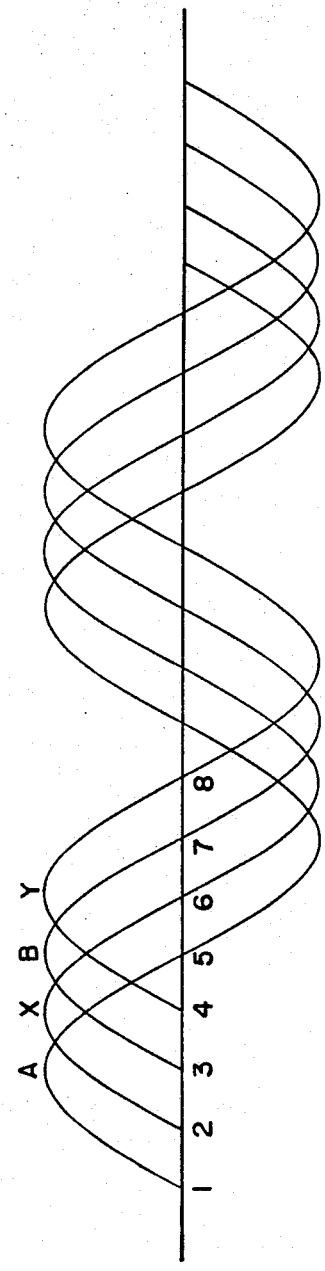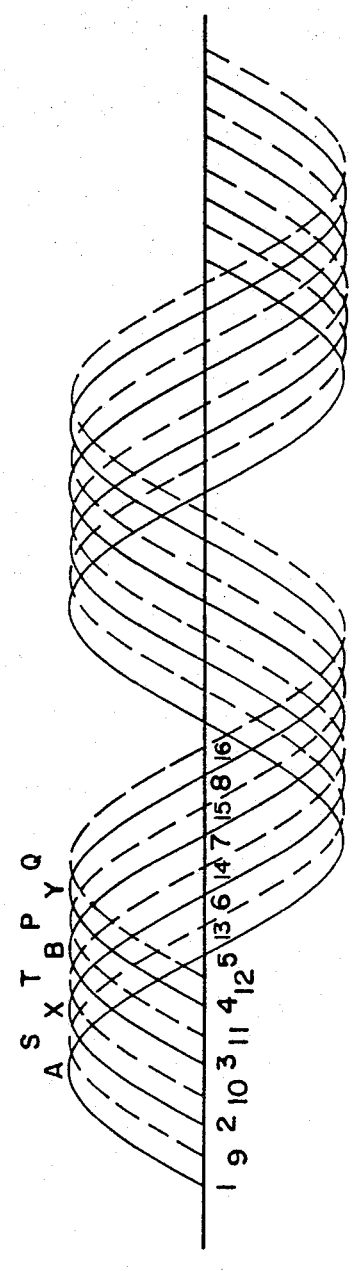
Fig. 3
Fig. 6
Fig. 9

READOUT FOR A RING LASER ANGULAR RATE SENSOR

This application is a continuation of application Ser. No. 847,379, filed Apr. 2, 1986, and now abandoned.

FIELD OF THE INVENTION

The present invention relates to a novel readout circuit for a ring laser angular rate sensor.

Ring laser angular rate sensors are well known and are particularly described in U.S. Pat. No. 3,373,650, issued to Killpatrick, and U.S. Pat. No. 3,390,606, issued to Podgorski, both of which are assigned to the assignee of the present invention. The above-referred to patents are incorporated herein by reference thereto. Ring laser angular rate sensors of the type referred to commonly utilize a block of material that is dimensionally stable, both thermally and mechanically. The block usually includes a plurality of interconnected gas containing tunnels or passages which form a closed-loop path in the shape of a triangle, a rectangle, or any polygonal path. At each intersection of a pair of interconnected tunnels is a mirror mounted on the block. This arrangement of mirrors and interconnected tunnels forms an optical closed-loop path. Further, at least one anode and one cathode are each mounted on the block and in communication with the gas. Each of the components, including the mirrors, anode, and cathode, must be sealed to the block to form a gas tight seal. The block is usually filled with a lasing gas such as a mixture of helium and neon. A sufficiently large electrical potential is applied between the anode and cathode to cause a discharge current therebetween which results in the production of a pair of counter-propagating laser beams within the block.

Associated with ring laser angular rate sensors is a source of error usually referred to as "lock-in." The source of error is thought to be predominantly caused by back scattering of light at each of the mirrors which form in part the optical closed-loop path which the counter-propagating laser beams traverse. As is well understood by those skilled in the art, there are two widely used techniques to minimize the lock-in error. The first technique consists of dithering the block as taught in U.S. Pat. No. 3,373,650. Mechanically dithering the laser block reduces the source of error caused by lock-in to acceptable levels such that ring laser angular rate sensor have become commercially successful.

The second technique consists of producing mirror assemblies structured so as to provide highly polished substrates having superior reflective coatings which achieve minimal laser beam scattering at the surfaces thereof. Development of the mirror assemblies over the years has made it possible for high performance ring laser angular rate sensors.

In order to obtain useful information from the ring laser angular rate sensors as described above, a small percentage of the counter-propagating laser beams is allowed to pass through one of the mirrors. The light beams are commonly passed through a prism which combines the beams at slightly different angles and thereby creates an interference fringe pattern across a surface of a readout apparatus containing two photodetectors such as photosensitive diodes. The two photodetectors may be discreet or may be part of an integrated circuit chip. The readout is intended to provide a pair of output signals in phase quadrature. One common example of a readout requires the photodetectors to be separated by one quarter of a fringe spacing so as to provide readout output signals in phase quadrature. Other readouts include, among others, a pair of photodetectors and appropriate masks.

When a ring laser is rotated about its input axis, the counter-propagating beam frequencies change slightly, one increasing and the other decreasing in proportion to the rotation rate of the sensor. The difference in beam frequencies results in a beat frequency which is indicated by the rate of movement of the fringe pattern across the photodetectors. At least one of the photodetector outputs is fed into a logic circuit for subsequent counting of the number of fringes passing across the photodetector. The number of fringes passing a detector is directly related to the actual angular rotation rate of the sensor. The two detector output signals are compared to ascertain sensor rotation direction.

SUMMARY OF THE INVENTION

An object of the invention is to provide a high resolution ring laser angular rate sensor readout.

In the present invention, the sensor readout includes optics for producing an interference fringe pattern to impinge upon a pair of photodetectors. The detectors are positioned to provide a first pair of output signals in phase quadrature and representative of the interference fringe pattern inpinging thereon. A second pair of analog signals representing the difference and sum of the pairs of analog signals is generated and presented to a signal processing circuit in combination with the first pair of phase quadrature signals. These four signals are, in turn, processed to provide signal indications of $\frac{1}{8}$ of an interference fringe passing either one of the photodetectors.

BRIEF DESCRIPTION OF THE DRAWINGS

FIG. 3 represents the analog output signal of the photodetectors.

FIG. 6 represents the analog output signals of the two photodetector output signals and the pair of signals generated by the circuit of FIG. 5.

FIG. 9 represents the analog output signals of FIG. 6 and those additional analog signals generated by the circuitry of FIG. 8.

DETAILED DESCRIPTION OF THE INVENTION

Figure 1:
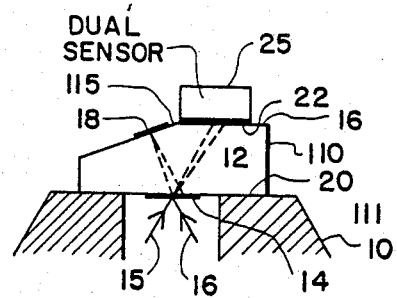
FIG. 1 is an illustration of a ring laser readout system for generating a interference fringe pattern.

FIG. 1 illustrates an optical system for producing an interference fringe pattern resulting from the combining of a portion of each of the laser beams of the ring laser angular rate sensor. FIG. 1 shows only one of the reflection surfaces which defines, in part, the optical closed-loop path of a ring laser angular rate sensor. Sensor block 10 is of the type shown and described in U.S. Pat. No. 3,390,606, which is incorporated herein by reference thereto.

Fixed to block 10 is mirror/readout prism 12 including substrate 110 for transmitting light. Substrate 110 includes a first major surface 111 suitably polished and optically coated to provide a partially transmissive mirror 14 for reflecting a major portion of beam 16 impinging thereon in a direction opposite of beam 15. Similarly, mirror 14 reflects a major portion of beam 15 in the opposite direction of beam 16 in a well known manner so as to provide counter-propagating laser beams within block 10. The angle between beams 15 and 16 depends upon the optical closed-loop path chosen, i.e., triangular (60°), rectangular (90°), and the like.

Substrate 110 further includes a second surface 115 suitably polished and optically coated for providing a mirror surface 18. Mirror 18 is positionally located so as to reflect that portion of beam 16 transmitted through mirror 14. Substrate 110 is constructed such that the surface 115 is at a selected angle relative to surface 111 which in turn determines the angle between the incident and reflected beams at the surface of mirror 18.

In turn, the reflected beam from mirror 18 is reflected from mirror 14 so as to travel at a slight angle relative to that portion of beam 15 transmitted through mirror 14. The transmitted portion of beam 15 through mirror 14 and doubly reflected portion of beam 16 arrive at transmissive surface 116 so as to form an interference fringe pattern at the surface thereof.

Also shown in FIG. 1 is a dual photodetector sensor 25 coupled to surface 116 for being responsive to the interference fringe pattern passing therethrough. Although sensor 25 is shown rigidly secure to surface 116, sensor 25 may be spatially removed from surface 116 but still be responsive to the interference fringe pattern transmitted through surface 116.

Figure 2:
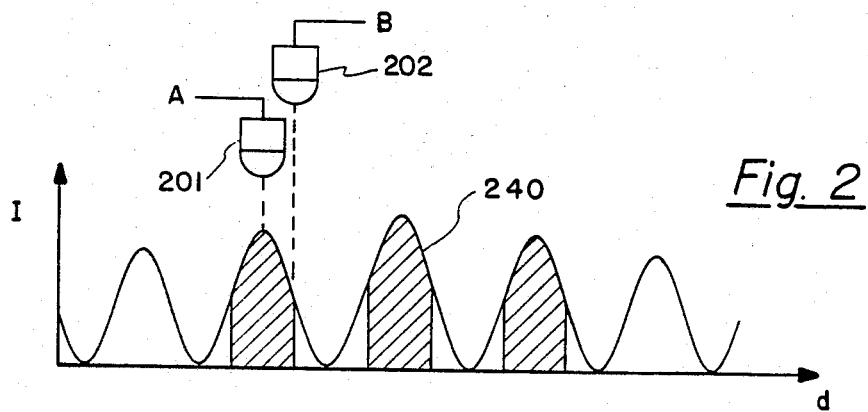
FIG. 2 illustrates the intensity of the interference fringe pattern impinging on a pair of photodetectors in the readout system.

In FIG. 2, there shown are a pair of photodetectors 201 and 202 having output signals A and B, responsive to an interference fringe pattern 240 shown as an intensity curve versus distance across the surface 116. Photodetectors 201 and 202 are shown to be separated by ¼ of a fringe spacing such that movement of the interference pattern will produce signals A and B which are in phase quadrature.

Figure 4:
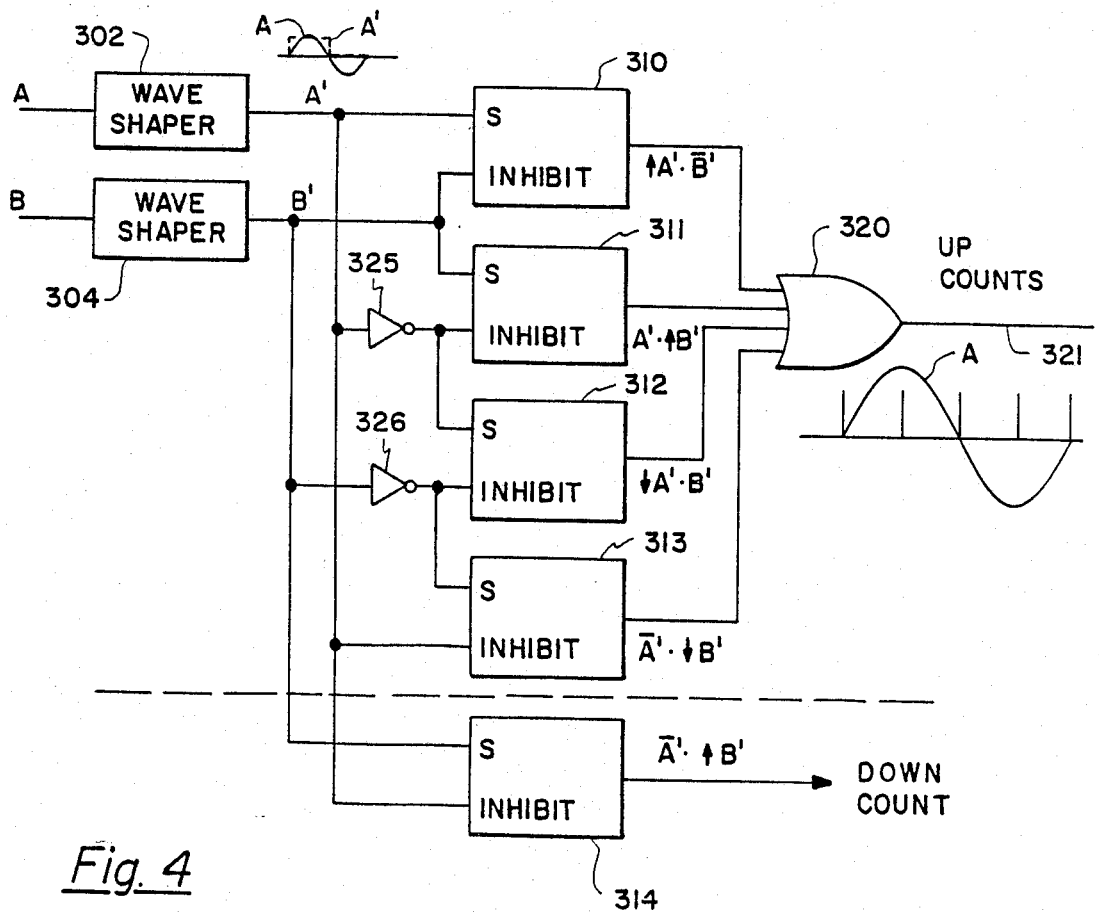
FIG. 4 is a block diagram of a readout circuit for operating on signals A and B of FIG. 3, representative of the phase quadrature photodetector output signals, to provide readout information having quarter count phase resolution information.

The photodetectors 201 and 202 provide analog signals which may be utilized to count full fringes passing a photodetector and are also utilized to determined direction of movement of the fringes. FIG. 3 graphically illustrates the phase quadrature relationship between analog signals A and B. FIGS. 3 and 4 illustrate how signals A and B may be utilized to obtain a resolution of ¼ of a fringe or simply ¼ of a count which may be counted so as to obtain angular information in a well known manner. That is, passing of one complete fringe corresponds to a known angular rotation based on the geometry of the sensor.

Referring now to FIG. 4, signals A and B are respectively passed through wave shaping circuits 302 and 304, respectively, so as to produce logical signals A' and B'. Herein the prime (') indicates logical signals whereas the absence of the prime indicates analog signals. The correlation between signal A and signal A' is indicated in FIG. 4 just above the signal line A'.

Shown in FIG. 4 are five one-shot circuits 310, 311, 312, 313 and 314. The outputs of one-shots 310-313 are each presented as inputs to an OR circuit 320 which provides an output signal indicative of up-counts which correspond to a particular direction of the sensor as will subsequently be described. Each of the one-shots has a trigger input, identified as the "S" input, an input which upon a rising signal will cause an output pulse to appear at its output if the inhibit signal line is at a low level. The circuits as illustrated in the Figures, as will be described, may be provided by a variety of digital circuit techniques including those which ar both synchronous and asynchronous.

Again referring to FIG. 4, output signal A' is presented as the s-input to one-shot 310 and the inhibit input of one-shot 313. Signal A' is inverted by inverter 325 and presented to the inhibit input of one-shot 311 and the s-input of one-shot 312. Signal B' is presented as the inhibit input of one-shot 310 and the s-input of one-shot 311. Signal B' is inverted by inverter 326 and subsequently presented to the inhibit input of one-shot 312 and the s-input of one-shot 313.

The operation of the circuit shown in FIG. 4 is particularly illustrated by the graphical diagrams of FIG. 3. Up-count signals at the output of OR gate 320 will occur at zero crossing points of signals A and B occurring at points 1, 3, 5, and 7. Thus, for each passing of a full fringe, four pulses occur at the output of OR gate 320. Although the representation shown in FIG. 3 shows a symmetrical sine wave for signals A and B, it should be recognized by the those skilled in the art that the passing of a full cycle of signal A corresponds to a 360° phase change between the counter-propagating laser beams. The phase change will, of course, depend upon the speed at which the sensor is rotating. Nonetheless, regardless of the rate of rotation, the output pulses will occur at signal points 1, 3, 5, and 7 to indicate the rotation of the sensor.

Also illustrated in FIG. 4 is one-shot 314 having its s-input connected to the output signal B' and the inhibit input connected to signal A'. When rotation is reversed in the direction, the output of one-shot 314 provides output signals referred to as down-counts indicating an opposite direction. Further circuits may, of course, be added to provide the full ¼ count resolution as accomplished by one-shots 310–313, but have been left out for simplicity.

Figure 5:
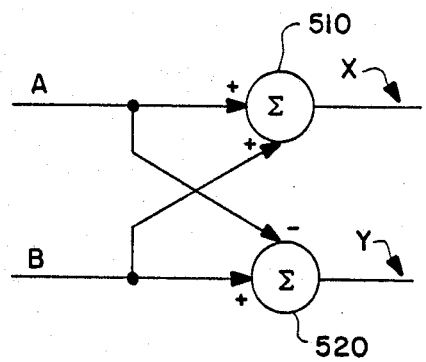
FIG. 5 is a schematic block diagram for obtaining an additional pair of phase quadrature output signals in accordance with the present invention.

In accordance with the present invention, the circuit illustrated in FIG. 5 can be utilized to provide improved resolution by operating upon normalized analog signals A and B to provide two new analog signals X and Y as will now be described. Signal A and signal B are presented to an analog summing circuit 510 having an output signal indicated as signal X. Further, analog summing circuit 520 provides the difference signal between signal B less signal A for providing output signal Y. The circuit of FIG. 5 shows how two normalized or equal amplitude phase quadrature signals A and B can be vectorially combined to produce an additional pair of phase quadrature signals displaced in phase relative to the orignal pair.

FIG. 6 illustrates the resultant phase relationship of analog signals A, B, X and Y. It should be noted that signals X and Y have been normalized for illustration purposes. However, in accordance with the circuit of FIG. 5, signals X and Y would have amplitudes different than those shown. Analog signals A, B, X and Y are successively separated in phase by 45° and correspond to a passing of a 45° phase change between the counter-propagating laser beams. Signals X and Y resulting from the operation of the circuit of FIG. 5 are an analog pair of signals also in phase quadrature but displaced in phase by $\pi/4$ relative to signals A and B, respectively.

Figure 7:
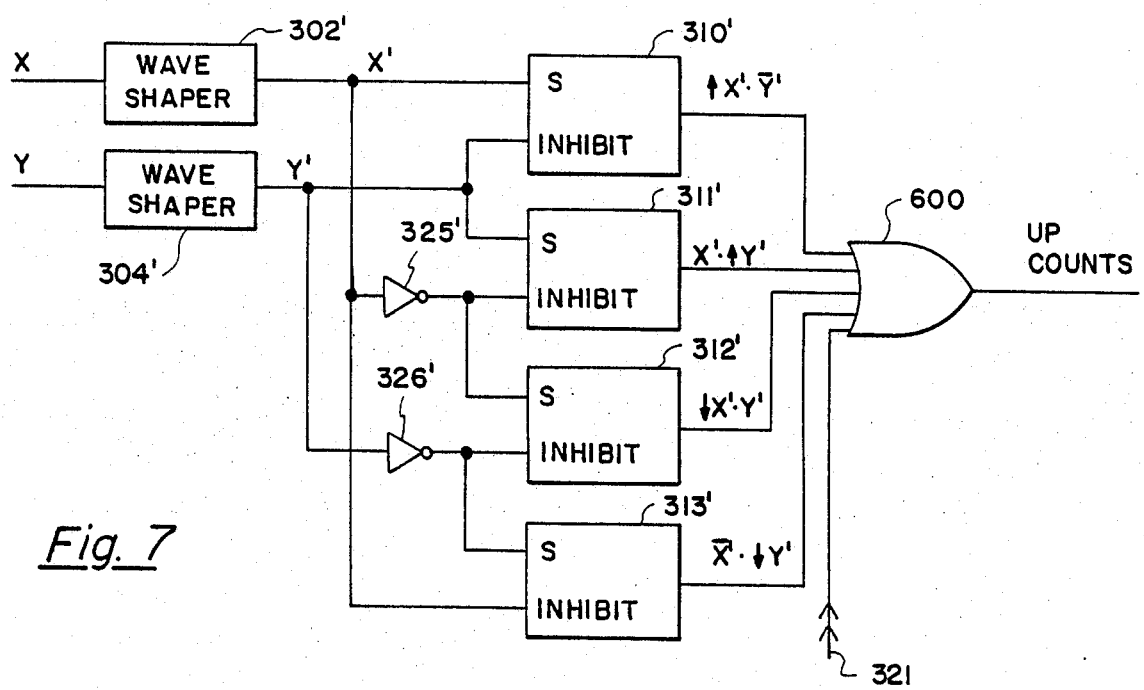
FIG. 7 shows a schematic block diagram of additional circuitry in combination with that of FIG. 4 to provide readout information having $\frac{1}{8}$th of a count phase resolution.

FIG. 7 illustrates how to signal process signals X and Y to provide further count information which may be combined with the up-counts from OR circuit 320 in FIG. 4. The combination of the circuits of FIGS. 4 and 7 will provide ⅛ count information ($\pi/4$) rotation information as will be described. The components designated in FIG. 7 are substantially the same as FIG. 3 except for the omission of down-count circuit 314. The circuit elements shown in FIG. 7 are similar to those shown in FIG. 4 with similarly functioning circuit components in FIG. 7 having the same numeral designations as in FIG. 4 except for the prime (') indicator. The circuit connections are identical to those in FIG. 4 except that the input to wave shaper 302' is signal X and the input to wave shaper 304' is signal Y. OR gate 600 serves the same intended function as OR gate 320 except it also includes inputs from the output of OR gate 320 identified as signal 321.

The operation of the circuit of FIG. 7 will now be described with reference to the signal relationships of FIG. 6. Output counts will be provided by the output of OR gate 600 at zero crossings indicated by signal points 1–8 where signal points 1, 3, 5, and 7 were those already described and obtained with the circuit of FIG. 4, and the signal relationships shown in FIG. 3. Each of the output counts produced at the output of OR circuit 600 will be separated by 45° indicating a $\pi/4$ phase change between the counter-propagating laser beams. Thus, for each fringe passing a photodetector in one direction, the circuit of FIG. 7 in combination with the circuit of FIG. 4 will provide 8 counts, each representing a $\pi/4$ phase change between the counter-propagating laser beams.

Figure 8:
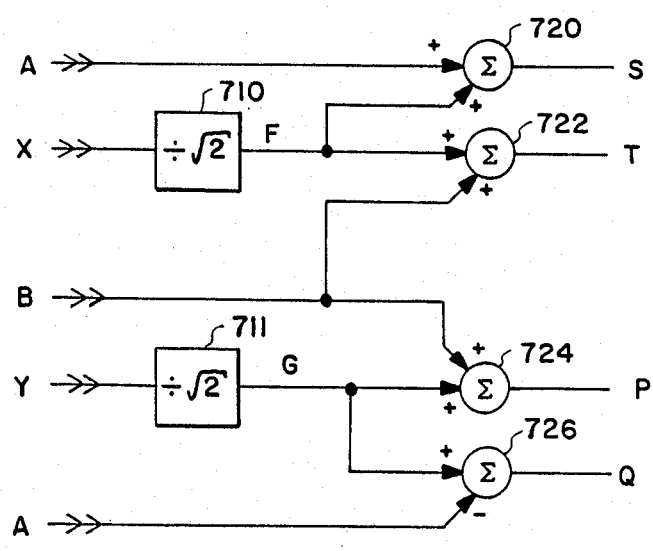
FIG. 8 is a schematic block diagram showing how the signals of the two photodetectors and those generated by circuitry of FIG. 5 may be combined in such a manner to provide a third pair of phase quadrature signals which may be utilized to provide resolution of 1/16th of a count.

Further resolution improvement by another factor of 2 may be accomplished in the present invention by use of the circuit of FIG. 8. In FIG. 8, signals X and Y are each passed through an atenuating circuit, respectively, identified by circuits 710 and 711 to produce signals F and G. Signals F and G are appropriately weighted signals X and Y. Signals F and G may then be combined with signals A and B to produce signals S, T, P, and Q. Four analog summing circuits 720, 722, 724, and 726 provide output signals S, T, P, and Q, respectively. Circuit 720 provides an analog sum of signals A and F, circuit 722 provides the sum of signal F and B, circuit 724 provides the sum of signal B and G, and circuit 726 provides the difference signal G - A. The phase relationships between analog signals A and B, X and Y, and S, T, P, and Q are illustrated in FIG. 9. Each of the analog signals are phase separated by 22.5° or $\pi/8$. It should be noted that signals S and P are in phase quadrature, and are similar to signals A and B, and signals T and Q are in phase quadrature and similar to signals X and Y, since signal S leads signal T by 45° and signal P leads signal Q by 45°, and that signals S and P, and T and Q are in phase quadrature with each other, respectively. Accordingly, additional circuitry, not shown, duplicating FIGS. 4 and 8, may be used to generate eight additional counts for each change of one fringe, where each of the additional counts are shifted in phase by $\pi/8$. If such additional circuitry was utilized, signals S and P would be substituted in FIG. 4 for signals A and B, and signals T and Q may be substituted in FIG. 7 for signals X and Y, such that the combination of all of the output pulses would provide 16 counts corresponding to the zero crossings indicated in FIG. 9 for each interference fringe passing the photodetectors.

It should be recognized by those skilled in the art that FIG. 6 shows two pairs of phase quadrature signals and FIG. 9 shows four pairs of phase quadrature signals. FIGS. 3 and 9 show multiples of "2" of the original pair of phase quadrature signals. It is within the scope of the invention to have other multiples, for example "3". Consider the situation where there are three pairs of phase quadrature signals. The first pair of signals are signals A and B, the second pair of signals are M and N, and the third pair of signals are P and Q. The second pair of phase quadrature signals M and N are displaced relative to the first pair by 30°, and the third pair of phase quadrature signals P and Q are displaced relative to the first pair by 60°. With these three pairs of signals, each change of one fringe will produce 12 zero crossings which may be processed in accordance with the circuitry as shown in FIGS. 4 and 7.

In order to generate the pair of phase quadrature signals M and N, and P and Q, signals A and B must be appropriately weighted before being combined to produce the vectorial sum of signals A and B. For example, to produce a first signal, for example, M, displaced relative to signal A by 30°, signal B would be weighted by tan (30°) before being summed with signal A. In order to produce signal N, signal B may be combined with the negative value of signal A having been passed through another atenuator having a value also equal to tan (30°) as before. Signals P and Q may be similarly produced by passing signals A and B through atenuators having a value substantially equal to tan (60°).

The combination set forth by the present invention and illustrated by the accompanying drawings provides high resolution circuitry for subdividing a passing interference fringe into discreet counts representative of precise phase changes between the counter-propagating laser beams. Therefore, while the present invention has been disclosed in connection with the preferred embodiments thereof, it should be understood that there may be other embodiments which fall within the spirit and scope of the invention as defined by the following claims.

The embodiments of the invention in which an exclusive property or right is claimed are defined as follows:

1. A readout apparatus for a laser angular rate sensor having counter-propagating laser beams which exhibit a change in frequency dependent upon rotation rate and direction, said readout apparatus comprising:

means for optically combining a portion of each of said beams to form an interference fringe pattern;

photodetection means responsive to said interference fringe pattern for providing a first pair of equal amplitude first and second signals substantially in phase quadrature and indicative of said interference fringe pattern impinging on said photodetection means;

means for summing said first and second signals and providing a third signal indicative of said sum;

means for determining the difference between said first and second signals and providing a fourth signal indicative of said difference; and signal processing means responsive to said frist, second, third, and fourth signals for generating a readout output signal having a signal change for substantially each ⅛ of a fringe change passing said photodetector means.

2. The apparatus of claim 1 wherein said signal processing means comprises:
first, second, third and fourth comparing means each responsive to said first and scond signals,
said first comparing means comparing said first and second signals and providing an output signal change for each occurence of the zero crossing instant of said first signal at the same time that said second signal is of a first state,
said second comparing means comparing said first and seocnd signals and providing an output signal change for each occurrence of the zero crossing instant of said first signal at the same time that said second signal is of a second state,
said third comparing means comparing said first and second signals and providing an output signal change for each occurrence of the zero crossing instant of said second signal at the same time that said first signal is of a first state,
said fourth comparing means comparing said first and second signals and providing an output signal change for each occurence of the zero crossing instant of said second signal at hte same time that said first signal is of a second state,
fifth, sixth, seventh and eighth comparing means each responsive to said third and fourth signals,
said fifth comparing means comparing said third and fourth signals and providing an output signal change for each occurrence of the zero crossing instant of said third signal at the same time that said fourth signal is of a first state,
said sixth comparing means comparing said first and second signals and providing an output signal change for each occurrence of the zero crossing instant of said third signal at the same time that said fourth signal is of a second state,
said seventh comparing means comparing said first and seocnd signals and providing an output signal change for each occurrence of the zero crossing instant of said fourth signal at the same time that said third signal is of a first state,
said eight comparing means comparing said first and second signals and providing an output signal change for each occurrence of the zero crossing instant of said fourth signal at the same time that said third signal is of a second state; and
output means responsive to said first, second, third, fourth, fifth, sixth, seventh and eighth comparing means output signals for providing an output signal having a signal change for each signal change of said first, second, third, fourth, fifth, sixth, seventh and eight comparing signal means output signals.

3. A readout apparatus for a laser angular rate sensor having counter-propagating laser beams which exhibit a change in frequency dependent upon rotation rate and direction, said readout apparatus comprising:
means for optically combining a portion of each of said beams to form an interference fringe pattern;
photodetection means responsive to said interference fringe pattern for providing a first pair of first and second analog signals substantially in phase quadrature and indicative fo said interference fringe pattern impinging on said photodetection means;
means responsive to said first pair of signals for providing a second pair of third and fourth analog signals in phase quadrature and phase displaced by a selected phase angle value relative to said first pair of signals; and
output means responsive to said first and second pairs of analog signals for providing an output signal change corresponding to selected zero crossings of said first and second analog signal pairs.

4. The apparatus of claim 3 wherein said selected phase displacement is $\pi/4$.

5. The apparatus of claim 4 further comprising:
means responsive to said first, second, third and fourth signals for providing a third pair and a fourth pair of analog signals, each of said third and fourth pairs of signals being in phase quadrature, and said third and fourth pairs of analog signals being phase displaced relative to said first and second pairs of signals by $\pi/8$; and
said output means is further responsive to said third and fourth signal pairs for additionally providing an output signal changer corresponding to selected zero crossings of said third and fourth signals.

6. The apparatus of claim 5 wherein said output means provides an output signal change corresponding to each phase change to $\pi/8$ between said counter-propagating laser beams.

7. The apparatus of claim 5 wherein said output means includes means for digitizing said first and second pairs of signals, and means for separately comparing said first pair of signals and separately comparing said second pair of signals through digitized signals.

8. The apparatus of claim 3 wherein said selected phase is displaced by $\pi/4$ and said output signal provides an output signal change corresponding to a $\pi/4$ phase change between said counter-propagating beams.

9. The apparatus of claim 3 wherein said output means provides an output signal change corresponding to each phase change of $\pi/4$ between said counter-propagating laser beam.

10. A readout apparatus for a laser angular rate sensor having counter-propagating laser beams which exhibit a change in frequency dependent upon rotation rate and direction, said readout apparatus comprising:
means for optically combining a portion of each of said beams to form an interference fringe pattern;
photodetection means responsive to said interference fringe pattern for providing a first pair of first and second signals substantially in phase quadrature and indicative of said interference fringe pattern impinging on said photodetection means;
means for vectorially combining the weighted sum of said first and second signals to provide a third signal displaced in phase by a selected phase value relative to said first signal of said first pair;
means for vectorially combining the weighted sum of said first and second signals to provide a fourth signal in phase quadrature with said third signal; and
signal processing means responsive to said first, second, third, and fourth signals for generating a readout output signal having a signal change for substantially each zero crossing of said first, second, third, and fourth signals.

* * * * *

UNITED STATES PATENT AND TRADEMARK OFFICE
CERTIFICATE OF CORRECTION

PATENT NO. : 4,791,460

DATED : December 13, 1988

INVENTOR(S) : JAMES W. BERGSTROM and MARK W. WEBER

It is certified that error appears in the above-identified patent and that said Letters Patent is hereby corrected as shown below:

Column 7, line 1, delete "frist" and substitute with --first--.

Column 7, line 9, delete "scond" and substitute with --second--.

Column 7, line 16, delete "seocnd and substitute with --second--.

Column 7, line 28, delete "hte" and substitute with --the--.

Column 7, line 43, delete "seocnd" and substitute with --second--.

Column 8, line 24, delete "changer" and substitute with --change--.

Signed and Sealed this

Sixteenth Day of May, 1989

Attest:

DONALD J. QUIGG

Attesting Officer     Commissioner of Patents and Trademarks